United States Patent [19]
Roberts et al.

[11] Patent Number: 5,660,491
[45] Date of Patent: *Aug. 26, 1997

[54] UNIVERSAL JOINT FOR TORQUE TRANSMITTING TOOLS

[75] Inventors: Peter M. Roberts, Chattanooga, Tenn.; John B. Davidson, Chicago, Ill.

[73] Assignee: Roberts Tool International (USA), Inc., Chicago, Ill.

[ * ] Notice: The term of this patent shall not extend beyond the expiration date of Pat. No. 5,433,548.

[21] Appl. No.: 712,195

[22] Filed: Sep. 3, 1996

Related U.S. Application Data

[63] Continuation of Ser. No. 395,377, Feb. 21, 1995, abandoned, which is a continuation-in-part of Ser. No. 125,328, Sep. 22, 1993, Pat. No. 5,433,548.

[51] Int. Cl.$^6$ .................................................. F16C 11/06
[52] U.S. Cl. ......................... 403/74; 403/325; 403/322; 81/177.75; 81/177.85
[58] Field of Search .......................... 403/74, 73, 57, 403/53, 52, 19, 20, 322, 323, 325, 327, 321, DIG. 4; 81/177.85, 177.75, 177.7

[56] References Cited

U.S. PATENT DOCUMENTS

| | | |
|---|---|---|
| 1,569,117 | 1/1926 | Carpenter . |
| 1,660,989 | 2/1928 | Carpenter . |
| 1,775,402 | 9/1930 | Mandl . |
| 1,864,466 | 6/1932 | Peterson . |
| 2,072,463 | 3/1937 | Mims . |
| 2,108,866 | 2/1938 | Mandl . |
| 2,162,359 | 6/1939 | Rhinevault . |
| 2,304,766 | 12/1942 | Pratt ......................... 81/177.75 X |
| 2,721,090 | 10/1955 | Kaman . |
| 2,736,562 | 2/1956 | Blackburn . |
| 2,954,994 | 10/1960 | Beers . |
| 2,987,334 | 6/1961 | Wendling . |
| 3,011,794 | 12/1961 | Vaughn . |
| 3,012,420 | 12/1961 | Schaedler . |
| 3,018,866 | 1/1962 | Elliott et al. . |
| 3,069,945 | 12/1962 | Shandel . |
| 3,094,344 | 6/1963 | Varga . |
| 3,156,479 | 11/1964 | Drazick . |
| 3,167,338 | 1/1965 | Troike . |
| 3,208,318 | 9/1965 | Roberts . |
| 3,515,399 | 6/1970 | Wordsworth . |
| 3,522,713 | 8/1970 | Hayes . |
| 3,613,221 | 10/1971 | Pronk . |
| 3,777,596 | 12/1973 | Smyers, Jr. et al. . |
| 3,815,451 | 6/1974 | Penner . |
| 3,822,074 | 7/1974 | Welcker . |
| 3,890,051 | 6/1975 | Biek . |
| 3,924,493 | 12/1975 | Penner . |
| 4,245,528 | 1/1981 | Hugh et al. . |
| 4,367,663 | 1/1983 | Merics . |
| 4,399,722 | 8/1983 | Sardo, Jr. . |
| 4,420,995 | 12/1983 | Roberts . |
| 4,480,511 | 11/1984 | Nickipuck . |
| 4,508,005 | 4/1985 | Herman et al. . |
| 4,571,113 | 2/1986 | Coren . |
| 4,614,457 | 9/1986 | Sammon . |
| 4,781,085 | 11/1988 | Fox . |
| 4,794,828 | 1/1989 | Olson . |

(List continued on next page.)

FOREIGN PATENT DOCUMENTS

| | | |
|---|---|---|
| 0066710 | 12/1982 | European Pat. Off. . |
| 847209 | 10/1939 | France . |
| 2121316 | 9/1972 | Germany . |

*Primary Examiner*—Harry C. Kim
*Attorney, Agent, or Firm*—Brinks Hofer Gilson & Lione

[57] ABSTRACT

A socket wrench universal joint includes a socket engaging element movably mounted in the drive stud of the universal joint to engage a socket. An actuator is mounted to the universal joint for manipulation by a user, and a linking element links the actuator and the socket engaging element. The actuator allows the user to alter the socket retaining forces. In a quick release version the operator can release a socket from the drive stud of the universal joint by appropriately manipulating the actuator. In another version the user can enhance socket retaining forces by properly manipulating the actuator.

21 Claims, 4 Drawing Sheets

U.S. PATENT DOCUMENTS

| | | |
|---|---|---|
| 4,817,475 | 4/1989 | Kelly et al. . |
| 4,817,476 | 4/1989 | Karge ................................. 81/177.85 |
| 4,848,196 | 7/1989 | Roberts . |
| 4,865,485 | 9/1989 | Finnefrock, Sr. ................. 403/325 X |
| 4,941,862 | 7/1990 | Hazebrook et al. . |
| 5,090,275 | 2/1992 | McCann . |
| 5,214,986 | 6/1993 | Roberts . |
| 5,216,940 | 6/1993 | Hedden . |
| 5,233,892 | 8/1993 | Roberts . |
| 5,291,809 | 3/1994 | Fox, III et al. ..................... 81/177.85 |
| 5,333,523 | 8/1994 | Palm ................................ 403/325 X |
| 5,390,591 | 2/1995 | Fox, III et al. ................... 403/325 X |
| 5,433,548 | 7/1995 | Roberts et al. ........................... 403/74 |

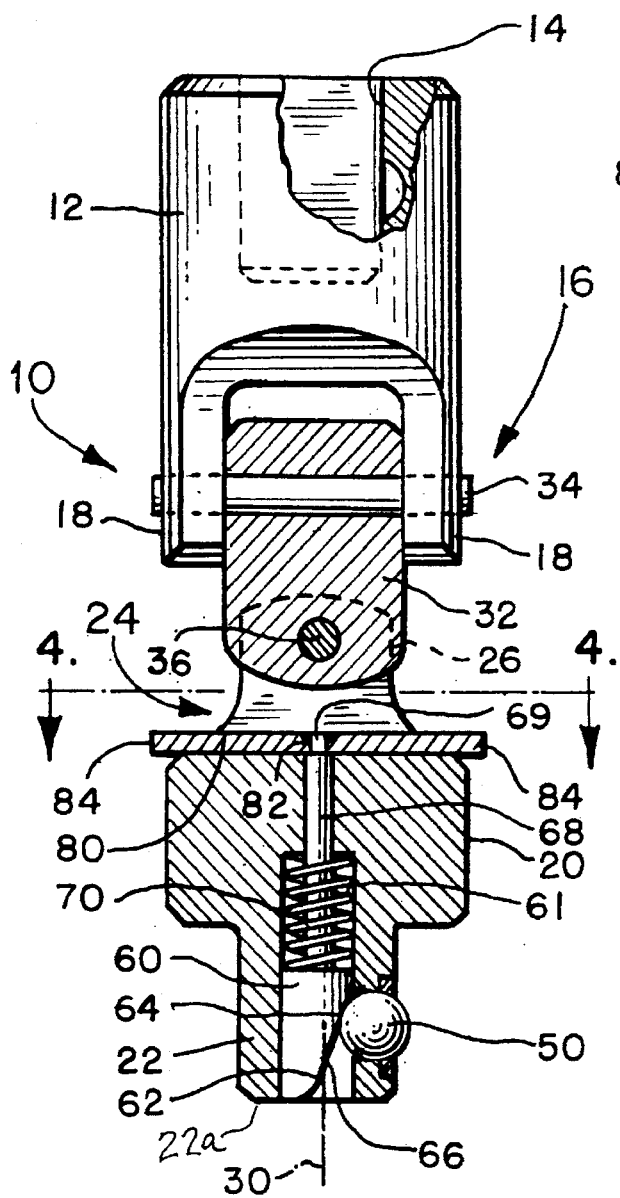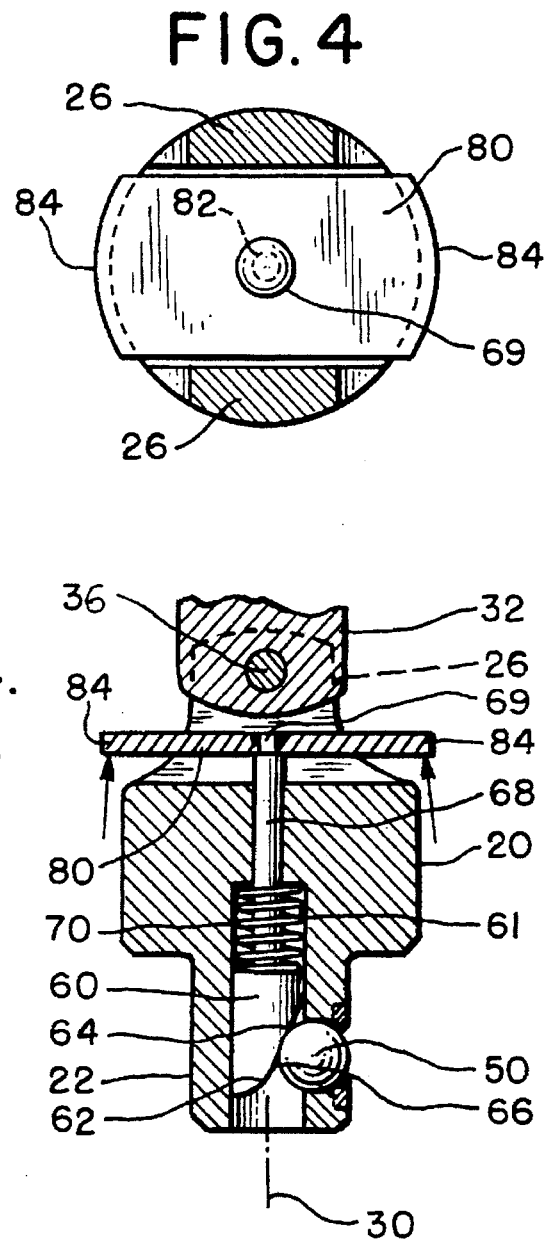

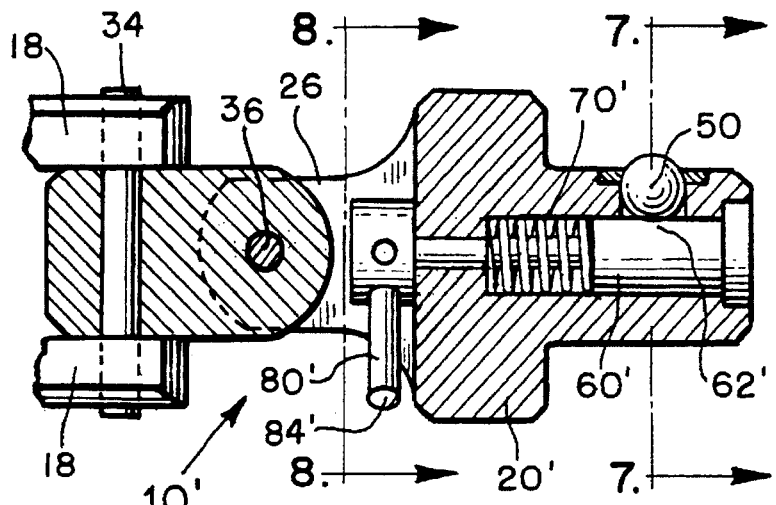
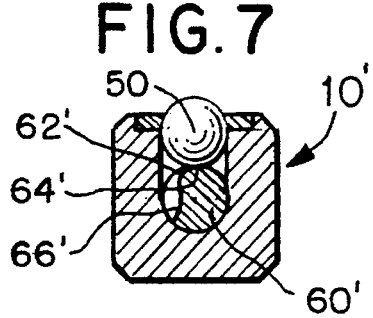
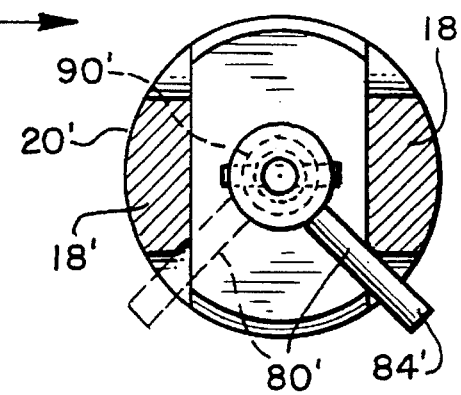
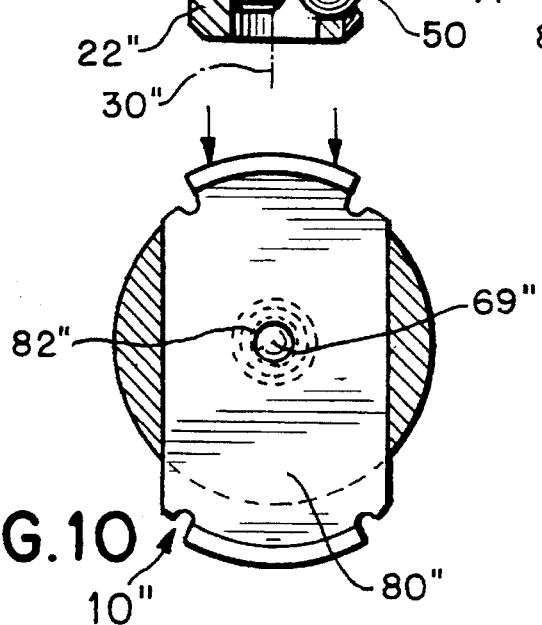
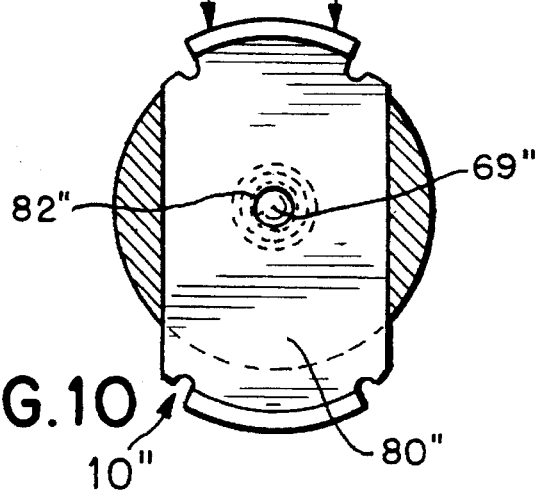
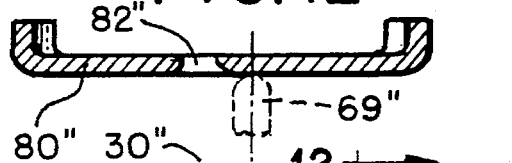
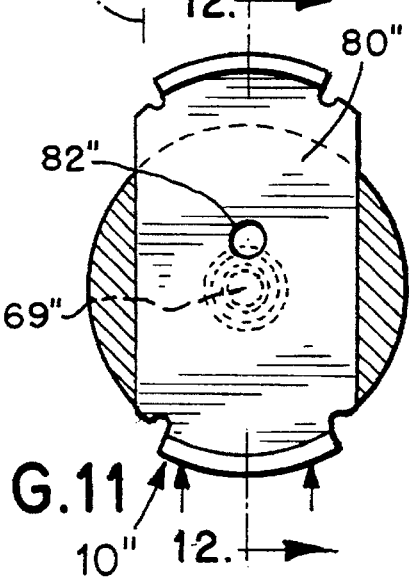

FIG. 13
FIG. 14
FIG. 15
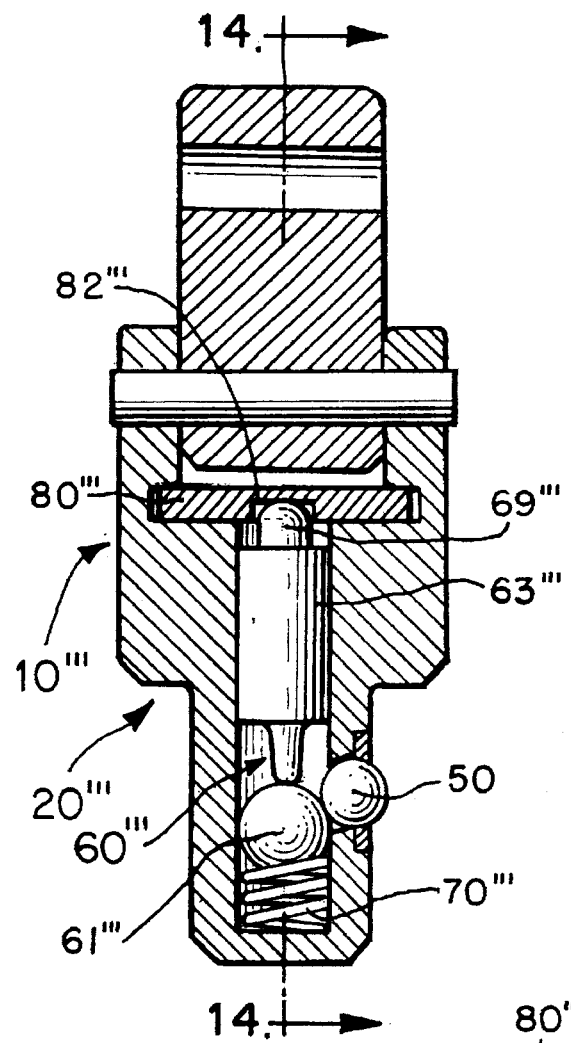
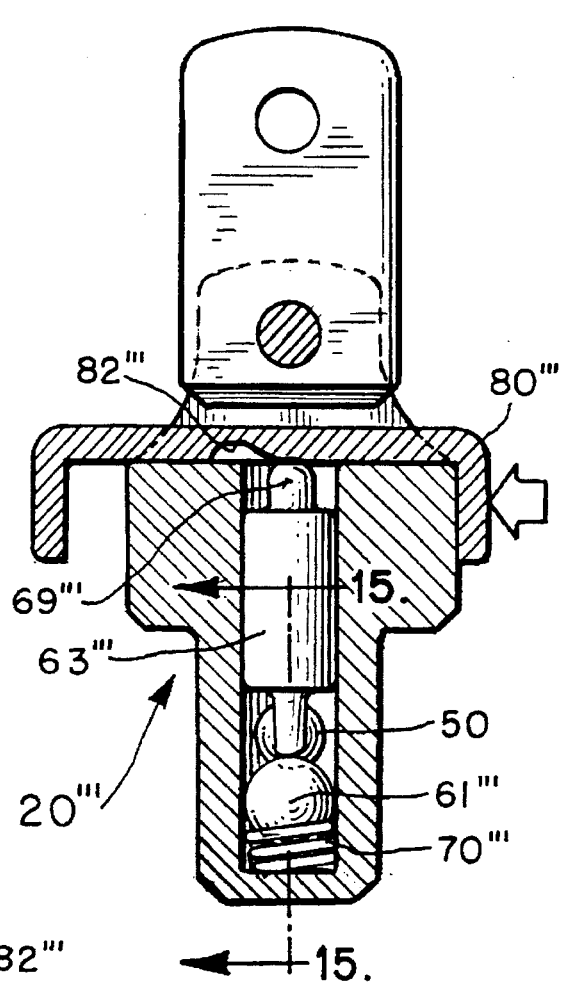
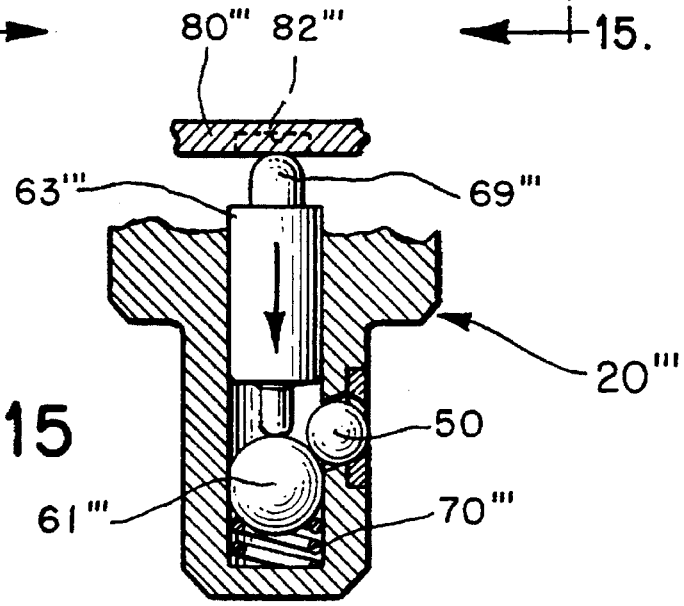

UNIVERSAL JOINT FOR TORQUE TRANSMITTING TOOLS

CROSS REFERENCE TO RELATED APPLICATION

This application is a continuation of application Ser. No. 08/395,377, filed Feb. 21, 1995, now abandoned, which is a continuation-in-part of U.S. patent application Ser. No. 08/125,328, filed Sep. 22, 1993, now U.S. Pat. No. 5,433,548.

BACKGROUND OF THE INVENTION

This invention relates to a universal joint of the type comprising first and second parts, wherein the first part defines a recess configured to receive a drive stud of a torque transmitting tool and the second part comprises a drive stud configured to engage a tool head. At least one coupling element is positioned between the first and second parts to transmit torque therebetween while allowing the first and second parts to rotate with the first part positioned in a skew orientation with respect to the second part.

Universal joints of this type are in common use with torque transmitting tools such as socket wrenches. See for example the constant velocity type universal joint described in Hazebrook U.S. Pat. No. 4,941,862. Conventional universal joints include a spring biased detent ball on the drive stud that engages the recess of the tool head that is mounted to the universal joint to provide a retention force that cannot be readily altered or selected by the user.

This arrangement is not without disadvantages. In particular, on some occasions it would be preferable if a tool head were held in place in the drive stud more securely and more positively. On other occasions it would be preferable if a tool head could be released from the drive stud so as to drop freely from the drive stud and allow one hand removal of the tool head mounted on the drive stud.

SUMMARY OF THE INVENTION

The present invention is directed to an improved universal joint that allows a user to control tool head retention forces manually.

According to this invention, a universal joint of the type described initially above is provided with an engaging element movably mounted in the drive stud of the second part to engage the tool head when in an engaging position and to release the tool head when in a releasing position. An actuator is mounted to one of the first and second parts for manipulation by a user between first and second positions. A linking element is movable by the actuator and is coupled to the engaging element to alter effectiveness of the engaging element in retaining a tool head on the drive stud of the second part, thereby allowing the user to control said retention forces manually.

In a first group of embodiments the linking element accommodates movement of the tool head engaging element to allow the user to release the tool head from the second part by moving the actuator to the first position. The quick release embodiments of this invention described below allow one hand removal of a tool head from a universal joint. The user can simply manipulate the actuator to release the tool head from the drive stud of the universal joint, allowing the tool head to fall from the drive stud.

In a second group of embodiments the linking element is configured to allow the tool head engaging element to move to the releasing position when the actuator is moved to the first position, and to hold the tool head engaging element in the engaging position when the actuator is moved to the second position to retain the tool head on the drive stud of the second part more securely when the actuator is moved to the second position. These embodiments allow a user selectively to enhance retention of a tool head on the drive stud of the universal joint, again by manipulating the actuator. This can be useful in situations where the user wishes to guard against inadvertent removal of the tool head from the universal joint during use.

The invention itself, together with further objects and attendant advantages, will best be understood by reference to the following detailed description, taken in conjunction with the accompanying drawings.

BRIEF DESCRIPTION OF THE DRAWINGS

FIG. 3 is a view in partial cutaway and partial section taken along line 3—3 of FIG. 1, showing the socket engaging element in the engaging position.

FIG. 4 is a cross-sectional view taken along line 4—4 of FIG. 3.

FIG. 5 is a fragmentary cross-sectional view corresponding to FIG. 3, showing the socket engaging element in the releasing position.

FIG. 6 is a fragmentary cross-sectional view of a second preferred embodiment which utilizes a circumferential ramp.

FIG. 7 is a cross-sectional view taken along line 7—7 of FIG. 6.

FIG. 8 is a cross-sectional view taken along line 8—8 of FIG. 6.

FIG. 9 is a fragmentary cross-sectional view of a third preferred embodiment of this invention.

FIG. 10 is a cross-sectional view taken along line 10—10 of FIG. 8, showing the element 80" shifted in the direction of the arrows.

FIG. 11 is a cross-sectional view corresponding to FIG. 10, showing the element 80" shifted in the direction of the arrows.

FIG. 12 is a fragmentary cross-sectional view taken along line 12—12 of FIG. 11.

FIG. 13 is a cross-sectional view of a fourth preferred embodiment of this invention.

FIG. 14 is a partial cross-sectional view taken along line 14—14 of FIG. 13.

FIG. 15 is a fragmentary cross-sectional view taken along line 15—15 of FIG. 14.

DETAILED DESCRIPTION OF THE PRESENTLY PREFERRED EMBODIMENTS

Figure 1:
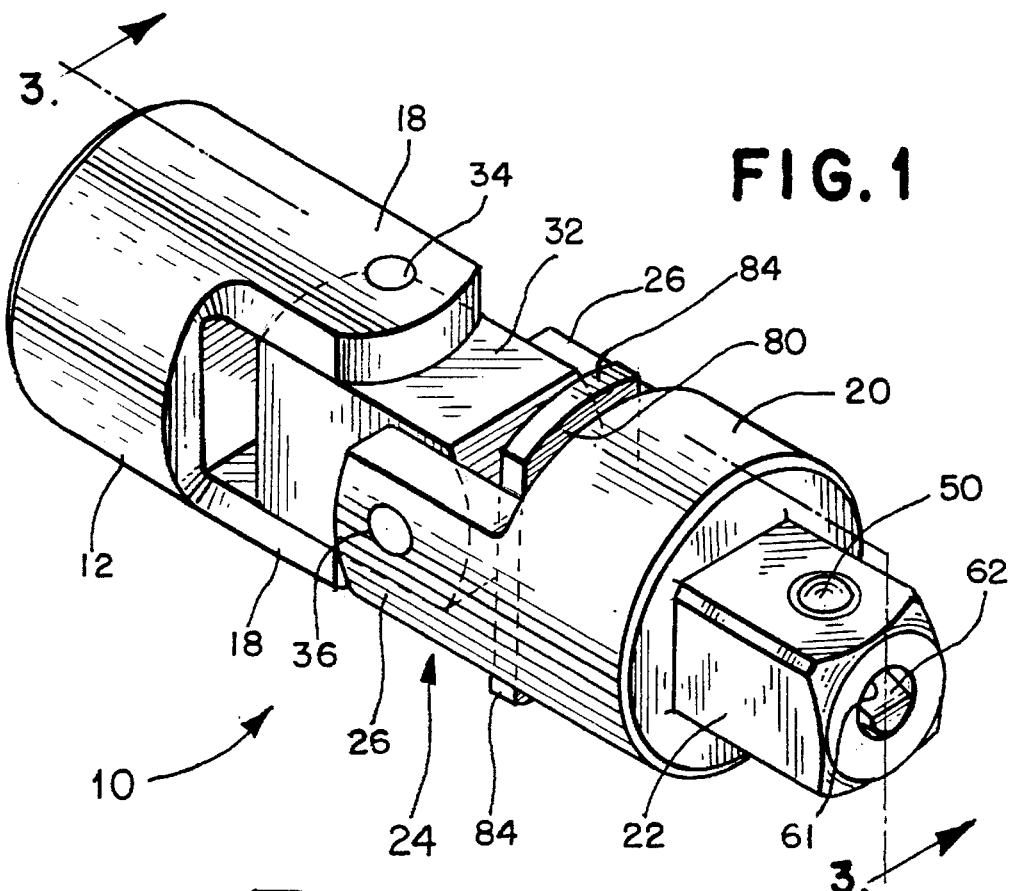
FIG. 1 is a perspective view of a universal joint which incorporates a first preferred embodiment of this invention.
Figure 2:
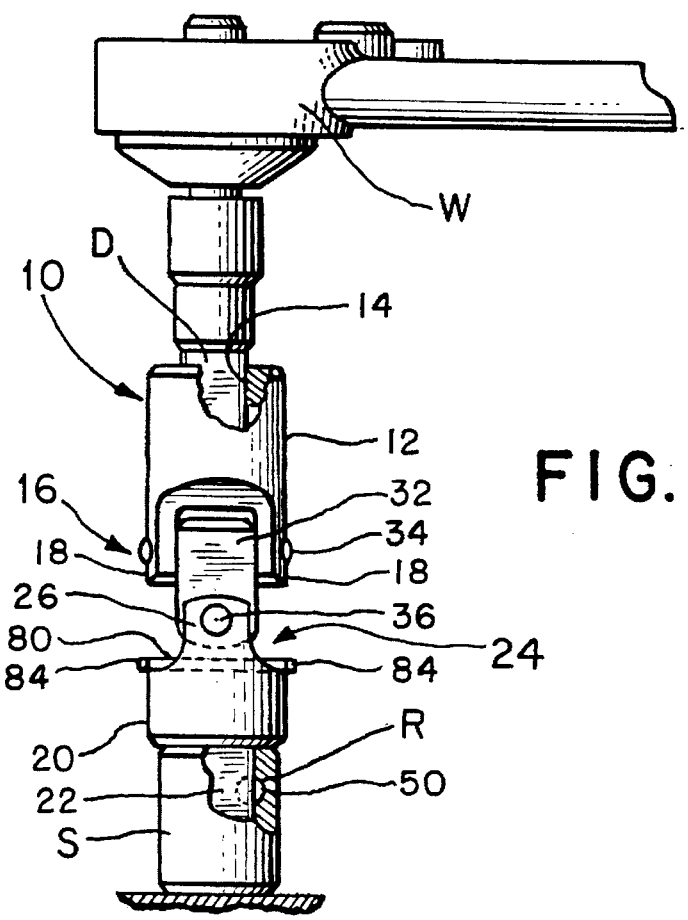
FIG. 2 is a side view in partial cutaway showing the universal joint of FIG. 1 mounted to a socket wrench and to a socket.

Turning now to the drawings, FIGS. 1–4 provide various views of a first preferred embodiment of the universal joint of this invention. The universal joint 10 includes a first part 12 and a second part 20. The first part 12 defines a recess 14 shaped to receive the drive stud D of a torque transmitting tool, which in this example is a socket wrench W with an extension bar (FIG. 2). As used herein, the term "torque transmitting tool" is intended to encompass the full range of tools for transmitting torque, including but not limited to socket wrenches, extension bars, T-bars, braces, as well as other hand and power tools. The first part 12 also defines a first joint portion 16 which includes two spaced, parallel arms 18.

The second part 20 includes a drive stud 22 shaped to engage a tool head such as a socket S, which is in turn configured to engage a workpiece such as a hexagonal bolt head or nut or other nonround workpiece (not shown) of a selected dimension. As used herein, the term "tool head" is intended to encompass the full range of devices, including but not limited to sockets, hex wrench heads, other types of wrench heads, tool bits of various types, and other types of bits including drill bits. The second part 20 also includes a second joint portion 24 which defines two spaced, parallel arms 26. A longitudinal axis 30 passes centrally through the drive stud 22.

A coupling element 32 pivotably interconnects the first and second parts 12, 20. In this embodiment the coupling element 32 is generally rectangular in shape, and it includes first and second orthogonally oriented pivot pins 34, 36. The pivot pin 34 is mounted in the first arms 18, such that the coupling element 32 is free to pivot with respect to the first part 12 about the first pivot pin 34. The second pivot pin 36 is mounted to the second arms 26, such that the second part 20 is free to pivot with respect to the coupling element 32 about the second pivot pin 36.

The foregoing features of the universal joint 10 are conventional, and they allow the first and second parts 12, 20 to rotate with the first part 12 positioned at a skew orientation with respect to the second part 20.

According to this invention, the universal joint 10 includes a tool head engaging element which can be a socket engaging element 50 which in this embodiment is spherical in shape. The socket engaging element 50 is movably mounted in the drive stud 22 such that it can be moved between an engaging position as shown in FIG. 3 and a releasing position as shown in FIG. 5. In the engaging position of FIG. 3, the socket engaging element 50 protrudes beyond the drive stud 22 to engage and retain the socket. In the releasing position of FIG. 5, the socket engaging element 50 is received entirely within the drive stud 22, thereby releasing the socket.

The position of the socket engaging element 50 is controlled at least in part by a linking element 60 which in this embodiment defines a longitudinally extending ramp 62 which is movable along the longitudinal axis 30. The linking element 60 is slideably received in a stepped bore 61 formed in the second part 20. The ramp 62 defines an elevated portion 64 and a lowered portion 66. The linking element 60 also includes a reduced diameter shaft 68 which terminates in a head 69. A spring 70, which in this embodiment is a coil compression spring, is mounted around the shaft 68 so as to bias the ramp 62 farther into the drive stud 22. In the rest position the elevated portion 64 of the ramp 62 is aligned with the socket engaging element 50, as shown in FIG. 3.

An actuator 80 which in this preferred embodiment is platelike defines an opening 82 and peripheral gripping portions 84. The actuator 80 is positioned between the second arms 26, in the region between the drive stud 22 and the coupling element 32. The shaft 68 of the linking element 60 passes through the opening 82, and the head 69 is secured to the actuator 80 to prevent the shaft 68 from moving out of the opening 82. For example, the head 69 may be welded or riveted in place on the actuator 80.

In the rest position of FIG. 3, the spring 70 holds the ramp 62 in a first position, in which the elevated portion 64 maintains the socket engaging element 50 in the engaging position of FIG. 3. When the user wishes to release a socket from the drive stud 22, the user manipulates the peripheral gripping portions 84 of the actuator 80 to move the actuator 80 to withdraw the ramp 62 partially from the drive stud 22 in this example. When the actuator 80 reaches a second position as shown in FIG. 5, in which the lowered portion 66 is aligned with the socket engaging element 50, the socket engaging element 50 is free to move radially inwardly, thereby releasing the socket. When the socket engaging element 50 is in the releasing position of FIG. 5, the socket is free to fall by force of gravity from the drive stud 22.

Depending upon the slope of the ramp 62, the universal joint 10 can be made to retain the socket with a more or less positive retention force. If the ramp 62 has a gradual slope, relatively large forces will be required to depress the socket engaging element 50 if the actuator 80 is not manipulated. With such an arrangement, a user will typically manually move the actuator 80 from the first position of FIG. 3 to the second position of FIG. 5 when moving a socket onto the drive stud 22. Alternately, if the slope of the ramp 62 is sufficiently steep, a user will be able to install a socket on the drive stud 22 simply by pushing the socket into position, without independently manipulating the actuator 80.

FIGS. 6–8 relate to a second preferred embodiment 10' which is in many ways similar to the preferred embodiment discussed above in conjunction with FIGS. 1–5. In the embodiment of FIGS. 6–8, the linking element 60' defines a ramp 62' which extends circumferentially around the linking element 60'. The illustrated ramp 62' is circular, but spiral ramps are also suitable. As best shown in FIG. 7, the ramp 62' defines an elevated portion 64' and a lowered portion 66' at respective angular positions of the linking element 60'. In this case the actuator 80' is a lever arm mounted to extend to a peripheral portion of the second part 20'. The lever arm 80' defines an extending peripheral portion 84' which is positioned to be manipulated by a user.

The embodiment of FIGS. 6–8 operates similarly to the embodiment of FIGS. 1–5, except that the user controls the position of the linking element 60' by rotating the actuator 80' through an arc of about 90°. In this case the spring 70' is a compression spring which tends to hold the linking element 60' by friction in the position in which it was left by the user. In the position shown in FIG. 7, the socket engaging element 50 is in the engaging position. Rotation of the actuator 80' by 90° aligns the lowered portion 66' with the socket engaging element 50 to release a socket from the drive stud of the universal joint 10'. If desired a spring such a torsion spring or a compression spring with a spiral ramp can be used to bias the ramp to a selected position.

The universal joints 10, 10' provide a quick release feature which is useful in many applications. FIGS. 9–12 relate to a third preferred embodiment which is designed to allow a user to choose between enhanced and reduced retention of a socket on the universal joint when desired. In this third embodiment, the universal joint 10" includes a linking element 60" which defines a ramp 62" which is similar to that described above. In this case the shaft 68" terminates in a stub shaft 69", as shown in FIG. 9. The actuator 80" is shaped as a plate which is mounted in the second part 20" so as to slide at right angles to the longitudinal axis 30". This plate 80" defines an opening 82" positioned selectively to block and allow movement of the linking element 60" along the longitudinal axis 30".

In the position shown in FIG. 9, the opening 82" is aligned with the stub shaft 69", and forces can be applied through the socket to the socket engaging element 50 in the direction of the arrow A to move the ramp 62" toward the coupling element 32", and the stub shaft 69" into the opening 82". This allows a user to install a socket onto the drive stud 22" by pressing it in place and to remove it by pulling it in the conventional manner. When a user desires to increase the forces tending to hold the socket in place on the drive stud 22", the user slides the actuator 80" so as to move the opening 82" out of alignment with the stub shaft 69" (FIGS. 11 and 12). In this position, the ramp 62" is blocked from moving toward the coupling element 32", and the socket is more securely held in place on the drive stud 22".

The embodiment of FIG. 9–11 does not provide a quick release function, but instead allows the user selectively to enhance the socket retaining forces in order to reduce the chance that a socket will inadvertently be removed from the drive stud.

FIGS. 13–15 relate to a fourth preferred embodiment which also allows the user to choose between enhanced and reduced retention of a socket on the universal joint when desired. In this fourth embodiment, the universal joint 10''' includes a tool engaging element such as a socket engaging element 50, the position of which is controlled at least in part by a sphere 61''' which is biased toward the socket engaging element 50 by a compression spring 70'''. The position of the sphere 61''' is controlled in part by the position of a slide 63''' which is slideably mounted in a bore in the second part 20''' of universal joint 10'''. The position of the slide 63''' is controllable by a user by means of an actuator 80''' which defines a recess 82''' sized to receive a portion of the end 69''' of the slide 63'''. In this embodiment the sphere 61''' and the slide 63''' cooperate to forms two-piece linking element 60''' that couples the actuator 80''' with the socket engaging element 50.

When a user moves the actuator 80''' to the position shown in FIG. 13 the spring 70''' biases the sphere 61''' into contact with the socket engaging element 50. Depending upon the spring force developed by the spring 70''', the universal joint 10''' can be designed such that in this position the socket engaging element 50 provides a small, moderate or large retention force, as appropriate for the particular application. In some embodiments the spring force generated by the spring 70''' may be so large as effectively to prevent a socket from being removed from the second part 20''' in the great majority of situations.

When a user desires to release a socket from the second part 20''' the user can slide the actuator relative to the second part 20''' to the left as shown in FIG. 14. This movement of the actuator 80''' moves the slide 63''' toward the spring 70''', thereby moving the sphere 61''' away from the socket engaging element 50. In this position of the sphere 61''', the socket engaging element 50 is free to move inwardly, thereby releasing a retained socket. Intermediate degrees of socket retaining forces can be obtained by positioning the actuator 80''' in an intermediate position between the positions of FIGS. 13 and 14.

The embodiment of FIGS. 13–15 allows the user selectively to enhance the socket retaining forces in order to reduce the chance that a socket will inadvertently be removed from the drive stud, while still providing a quick release function.

The embodiments described above provide the important advantage that the universal joint 10, 10', 10'', 10''' is not lengthened excessively. The actuator 80, 80', 80'', 80''' and the linking element 60, 60', 60'', 60''' are designed such that they can be installed in the second part 20, 20', 20'', 20''' without any substantial increase in the length of the second part 20, 20', 20'', 20'''. Excessive lengthening of the second part 20, 20', 20'', 20''' would make it more difficult or even impossible to use the universal joint 10, 10', 10'', 10''' in some applications where space is restricted. Excessive lengthening of the second part may also bring a mechanical disadvantage in some applications.

The linking elements 60, 60'', 60''' shift axially (parallel to the longitudinal axis 30, 30'') in use, yet even in this case the second part 20, 20'', 20''' is compact. In particular, the axial length of the second part 20, as measured from the distal end 22a of the drive stud 22 to the pivot axis (the center of the pivot pin 36), is preferably no more than about seven times a first distance, equal to the separation between the two pivot axes (the centers of the pivot pins 34, 36). More preferably, the length of the second part 20 is no more than about six times the first distance. Most preferably, the length of the second part 20 is no more than about five times the first distance. Similar ratios apply to the second parts 20'', 20'''.

In addition, the axial length of the second part, as measured from the distal end of the drive stud 22 to the pivot axis (the center of the pivot pin 36), is preferably no more than about 5 times the cross-sectional width of the drive stud 22, measured between parallel faces. More preferably, the axial length of the second part is no more than about 4 times the cross-sectional width of the drive stud 22. Most preferably, the axial length of the second part is no more than about 3 times the cross sectional width of the drive stud. Similar ratios apply to the second parts 20'', 20'''.

Of course, it should be understood that a wide range of changes and modifications can be made to the preferred embodiments described above. For example, the foregoing preferred embodiments all utilize a coupling member with two orthogonal pivot axes. Alternately, this invention may be used with a universal joint of the constant velocity type having a plurality of spherical coupling members. Also, for convenience various positions of the ramps, the socket engaging elements and the actuators have been described. It will of course be understood that the term "position" is intended to encompass a range of positions, as is appropriate for sockets that have recesses of varying dimensions. Also, various other types of quick release mechanisms can be adapted for use with the universal joint of this invention, as can other types of blocking mechanisms. Those skilled in the art will recognize that various actuators and linking elements can be used, and that some may include multiple component parts. A wide range of ramps can be used, including linear and non-linear ramps that translate, rotate, or move with a combination of rotation and translation. Many springs can be used to perform the biasing and holding functions described above.

It is therefore intended that the foregoing detailed description be regarded as illustrative rather than limiting, and that it be understood that it is the following claims, including all equivalents, which are intended to define the scope of this invention.

We claim:

1. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing-position, said engaging position comprising a range of positions including an outermost position;

a linking element coupled to the engaging element and movable in the drive stud of the second part to urge the engaging element outwardly to retain the tool head on the drive stud of the second part;

an actuator coupled to the linking element, said actuator manually movable by a user to move the linking element to affect retention of the tool head by the tool head engaging element;

said linking element comprising a surface contacting the engaging element when the engaging element is in the outermost position, said surface oriented such that incremental movement of the linking element causes incremental movement of the engaging element when the engaging element is in the outermost position;

wherein said second part defines an overall length, wherein said drive stud of the second part defines a minimum cross-sectional width transverse of the length, and wherein said length of the second part is no more than about five times the minimum cross-sectional width.

2. The invention of claim 1 wherein the linking element is axially movable in the drive stud of the second part.

3. The invention of claim 1 wherein the at least one coupling element comprises first and second pivot axes separated by a first distance, and wherein the second part defines a length which is no more than about seven times the first distance.

4. The invention of claim 3 wherein the length of the second part is no more than about six times the first distance.

5. The invention of claim 3 wherein the length of the second part is no more than about five times the first distance.

6. The invention of claim 3 wherein the second part comprises a distal end of the drive stud, and wherein the length of the second part is measured between the second pivot axis and the distal end.

7. The invention of claim 1 wherein the actuator is mounted at the second joint portion, closer to the coupling element than to the drive stud of the second part.

8. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein said second part comprises an opening near the coupling element, and wherein a portion of the linking element passes out of the second part via the opening.

9. The invention of claim 8 wherein the linking element is axially movable in the drive stud of the second part.

10. The invention of claim 8 wherein said second part defines an overall length, wherein said drive stud of the second part defines a minimum cross-sectional width transverse of the length, and wherein said length of the second part is no more than about five times the minimum cross-sectional width.

11. The invention of claim 10 wherein the length of the second part is no more than about 4 times the minimum cross-sectional width.

12. The invention of claim 10 wherein the length of the second part is no more than about 3 times the minimum cross-sectional width.

13. The invention of claim 10 wherein the second part comprises a pivot axis and a distal end of the drive stud of the second part, and wherein the length of the second part is measured between the pivot axis and the distal end of the drive stud of the second part.

14. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein the actuator is manually movable by the user along a path, and wherein the path is oriented nonparallel with respect to a longitudinal axis extending through the drive stud of the second part.

15. The invention of claim 1 or 8 or 14, wherein said linking element accommodates movement of the tool head engaging element to the releasing position when the actuator is in a first position, and to the engaging position when the actuator is in a second position to allow the user to release the tool head from the second part by moving the actuator to the first position.

16. The invention of claim 1 or 8 or 14, wherein said linking element allows the tool head engaging element to move to the releasing position when the actuator is moved to a first position, and holds the tool head engaging element in the engaging position when the actuator is moved to a second position to retain the tool head on the drive stud of the second part more securely when the actuator is moved to the second position.

17. The invention of claim 1 or 8 or 14, wherein the linking element comprises a ramp tapering progressively from an elevated portion to a lowered portion.

18. The invention of claim 17, wherein the elevated portion of the ramp is positioned nearer than the lowered portion of the ramp to the actuator, and wherein the linking element is mounted for sliding movement in the drive stud of the second part.

19. The invention of claim 17, wherein the tool head engaging element bears on the ramp such that the elevated portion holds the tool head engaging element in the engaging position and the lowered portion allows the tool head engaging element to move to the releasing position.

20. The invention of claim 1 or 8 or 14 further comprising a spring disposed around the linking element to bias the linking element.

21. The invention of claim 20 wherein the linking element is guided in the second part on both sides of the spring.

* * * * *

UNITED STATES PATENT AND TRADEMARK OFFICE
CERTIFICATE OF CORRECTION

| | | |
|---|---|---|
| PATENT NO. | : 5,660,491 C1 | |
| APPLICATION NO. | : 90/007429 | |
| DATED | : August 26, 1997 | |
| INVENTOR(S) | : Peter M. Roberts et al. | |

It is certified that error appears in the above-identified patent and that said Letters Patent is hereby corrected as shown below:

In column 6, claim 31, line 65, before "in an engaging position and" replace "wherein" with --when--.

In column 10, claim 44, line 12, before "invention of claim 14 wherein said second" replace "the" with --The--.

Signed and Sealed this
Twenty-eighth Day of December, 2010

David J. Kappos
*Director of the United States Patent and Trademark Office*

(12) EX PARTE REEXAMINATION CERTIFICATE (6273rd)
United States Patent
Roberts et al.

(10) Number: US 5,660,491 C1
(45) Certificate Issued: Jun. 24, 2008

(54) UNIVERSAL JOINT FOR TORQUE TRANSMITTING TOOLS

(75) Inventors: Peter M. Roberts, Chattanooga, TN (US); John B. Davidson, Chicago, IL (US)

(73) Assignee: Roberts Tool International (USA), Inc., Chicago, IL (US)

Reexamination Request:
No. 90/007,429, Feb. 18, 2005

Reexamination Certificate for:
Patent No.: 5,660,491
Issued: Aug. 26, 1997
Appl. No.: 08/712,195
Filed: Sep. 3, 1996

Related U.S. Application Data

(63) Continuation of application No. 08/395,377, filed on Feb. 21, 1995, now abandoned, which is a continuation-in-part of application No. 08/125,328, filed on Sep. 22, 1993, now Pat. No. 5,433,548.

(51) Int. Cl.
*F16C 11/06* (2006.01)

(52) U.S. Cl. ............ 403/74; 81/177.75; 81/177.85; 403/322.1; 403/325

(58) Field of Classification Search .......... 81/177.85, 81/177.75; 403/74; 464/112, 119
See application file for complete search history.

(56) References Cited

U.S. PATENT DOCUMENTS

| | | | |
|---|---|---|---|
| 4,614,457 A | * | 9/1986 | Sammon .............. 403/322.2 |
| 4,941,862 A | * | 7/1990 | Hazebrook et al. .......... 464/141 |
| 5,291,809 A | * | 3/1994 | Fox et al. ................. 81/177.85 |
| D359,668 S | | 6/1995 | Roberts et al. |
| 5,433,548 A | | 7/1995 | Roberts et al. |
| 5,501,125 A | | 3/1996 | Roberts et al. |
| 5,503,048 A | | 4/1996 | Moon |
| 5,644,958 A | | 7/1997 | Roberts et al. |
| 5,911,800 A | | 6/1999 | Roberts et al. |
| 6,098,500 A | | 8/2000 | Roberts et al. |
| 6,182,536 B1 | | 2/2001 | Roberts et al. |
| 2006/0117918 A1 | | 6/2006 | Davidson |

FOREIGN PATENT DOCUMENTS

| | | | |
|---|---|---|---|
| EP | 0066710 | * | 12/1982 |
| JP | 49-33296 | | 3/1974 |
| JP | 59-201768 | | 11/1984 |
| JP | 62-195467 | | 12/1987 |

OTHER PUBLICATIONS

Japanese Official Action; Mar. 17, 2003.

* cited by examiner

*Primary Examiner*—Jimmy G. Foster

(57) ABSTRACT

A socket wrench universal joint includes a socket engaging element movably mounted in the drive stud of the universal joint to engage a socket. An actuator is mounted to the universal joint for manipulation by a user, and a linking element links the actuator and the socket engaging element. The actuator allows the user to alter the socket retaining forces. In a quick release version the operator can release a socket from the drive stud of the universal joint by appropriately manipulating the actuator. In another version the user can enhance socket retaining forces by properly manipulating the actuator.

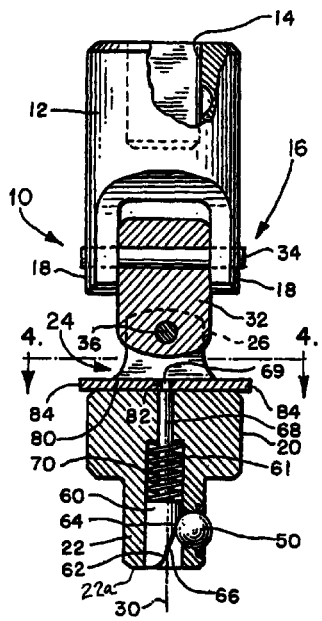

US 5,660,491 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 66 to column 4, line 12:
In the rest position of FIG. 3, the spring 70 holds the ramp 62 in a first position, in which the elevated portion 64 maintains the socket engaging element 50 in the engaging position of FIG. 3. *FIG. 3 shows the linking element 60 in the rest position, which represents an extreme of travel for the linking element 60 when the actuator 80 is free of user-supplied forces and the engaging element 50 is free of contact with a tool head such as a socket.* When the user wishes to release a socket from the drive stud 22, the user manipulates the peripheral gripping portions 84 of the actuator 80 to move the actuator 80 to withdraw the ramp 62 partially from the drive stud 22 in this example. When the actuator 80 reaches a second position as shown in FIG. 5, in which the lowered portion 66 is aligned with the socket engaging element 50, the socket engaging element 50 is free to move radially inwardly, thereby releasing the socket. When the socket engaging element 50 is in the releasing position of FIG. 5, the socket is free to fall by force of gravity from the drive stud 22.

Column 6, after line 50:
*It should be apparent from the foregoing description and drawings that each of the actuators discussed above (for example the actuator 80) is movable while being out of contact with the respective coupling element (for example the coupling element 32). Similarly, each of the actuators discussed above (for example the actuator 80) is positioned in the universal joint to isolate the actuator from torque transmitted by the respective coupling element (for example the coupling element 32). Also, each of the second joint portions discussed above (for example the second joint portion 24) comprises a radially outer portion, and each of the respective coupling elements (for example the coupling element 32) comprises a radially inner potion that is at least in part received between parts of the radially outer portion. Also, each of the actuators (for example the actuator 80) is positioned closer to the respective coupling element (for example the coupling element 32) than to the respective engaging element (for example the engaging element 50).*

AS A RESULT OF REEXAMINATION, IT HAS BEEN DETERMINED THAT:

Claim 1 is cancelled.

Claims 2, 3, 7, 8, 14–17 and 20 are determined to be patentable as amended.

Claims 4–6, 9–13, 18, 19 and 21, dependent on an amended claim, are determined to be patentable.

New claims 22–58 are added and determined to be patentable.

2. The invention of claim [1] *7, 22 or 58* wherein the linking element is axially movable in the drive stud of the second part.

3. The invention of claim [1] *7, 22 or 58* wherein the at least one coupling element comprises first and second pivot axes separated by a first distance, and wherein the second part defines a length which is no more than about seven times the first distance.

7. [The invention of claim 1] *In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:*

*a tool head engaging element movably mounted in the drive stud of the second part to engage the tool head when in an engaging position and to release the tool head when in a releasing-position, said engaging position comprising a range of positions including an outermost position;*

*a linking element coupled to the engaging element and movable in the drive stud of the second part to urge the engaging element outwardly to retain the tool head on the drive stud of the second part;*

*an actuator coupled to the linking element, said actuator manually movable by a user to move the linking element to affect retention of the tool head by the tool head engaging element;*

*said linking element comprising a surface contacting the engaging element when the engaging element is in the outermost position, said surface oriented such that incremental movement of the linking element causes incremental movement of the engaging element when the engaging element is in the outermost position;*

*wherein said second part defines an overall length, wherein said drive stud of the second part defines a minimum cross-sectional width transverse of the length, and wherein said length of the second part is no more than about five times the minimum cross-sectional width;*

*wherein the actuator is movable while being out of contact with the at least one coupling element; and*

*wherein the actuator is mounted at the second joint portion, closer to the coupling element than to the drive stud of the second part.*

8. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging postion and to release the tool head when in a releasing position;
a linking element coupled to the engaging element and movable in the drive stud of the second part to alter effectiveness of the engaging element in retaining the tool head on the drive stud of the second part; and
an actuator coupled to the linking element, said actuator manually moveable by a user to move the linking element to affect retention of the tool head by the tool head engaging element;
wherein said second part comprises an opening near the coupling element, and wherein a portion of the linking element passes out of the second part via the opening; and
wherein the second joint portion comprises a radially outer portion, and wherein the at least one coupling element comprises a radially inner portion that is at least in part received between parts of the radially outer portion.

14. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:
a tool head engaging element movably mounted in the drive stud of the second part to engage the tool head when in an engaging position and to release the tool head when in a releasing position;
a linking element coupled to the engaging element and movable in the drive stud of the second part to alter effectiveness of the enaging element in retaining the tool head on the drive stud of the second part; and
an actuator coupled to the linking element, said actuator manually movable by a user to move the linking element to affect retention of the tool head by the tool head engaging element;
wherein the actuator is manually movable by the user along a path, and wherein the path is oriented nonparallel with respect to a longitudinal axis extending through the drive stud of the second part; and
wherein the actuator is movable while being out of contact with the at least one coupling element.

15. The invention of claim [1 or] 8 or 14, wherein said linking element accommodates movement of the tool head engaging element to the releasing position when the actuator is in a first position, and to the engaging position when the actuator is in a second position to allow the user to release the tool head from the second part by moving the actuator to the first position.

16. The invention of claim [1 or] 8 or 14, wherein said linking element allows the tool head engaging element to move to the releasing position when the actuator is moved to a first position, and holds the tool head engaging element in the engaging position when the actuator is moved to a second position to retain the tool head on the drive stud of the second part more securely when the actuator is moved to the second position.

17. The invention of claim [1 or] 8 or 14, wherein the linking element comprises a ramp tapering progressively from an elevated portion to a lowered portion.

20. The invention of claim [1 or] 8 or 14 further comprising a spring disposed around the linking element to bias the linking element.

22. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:
a tool head engaging element movably mounted in the drive stud of the second part to engage the tool head when in an engaging position and to release the tool head when in a releasing-position, said engaging position comprising a range of positions including an outermost position;
a linking element coupled to the engaging element and movable in the drive stud of the second part toward a first position with respect to the drive stud to urge the engaging element outwardly to retain the tool head on the drive stud of the second part, said first position being an extreme of travel of the linking element with respect to the drive stud;
an actuator coupled to the linking element, said actuator manually movable by a user to move the linking element to affect retention of the tool head by the tool head engaging element;
said linking element comprising a surface contacting the engaging element when the engaging element is in the outermost position, said surface oriented such that incremental movement of the linking element causes incremental movement of the engaging element when the linking element is in the first position and the engaging element is in the outermost position;
wherein said second part defines an overall length, wherein said drive stud of the second part defines a minimum cross-sectional width transverse of the length, and wherein said length of the second part is no more than about five times the minimum cross-sectional width; and
wherein the actuator is positioned in the universal joint to isolate the actuator from torque transmitted by the at least one coupling element.

23. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:
a tool head engaging element movably mounted in the drive stud of the second part to engage the tool head when in an engaging position and to release the tool head when in a releasing position;
a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein the actuator is manually movable by the user along a path, and wherein the path is oriented nonparallel with respect to a longitudinal axis extending through the drive stud of the second part; and wherein the actuator is positioned in the universal joint to isolate the actuator from torque transmitted by the at least one coupling element.

24. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein the actuator is manually movable by the user along a path, and wherein the path is oriented nonparallel with respect to a longitudinal axis extending through the drive stud of the second part;

wherein the second joint portion comprises a radially outer portion, and wherein the at least one coupling element comprises a radially inner portion that is at least in part received between parts of the radially outer portion.

25. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein said second part comprises an opening near the coupling element, and wherein a portion of the linking element passes out of the second part via the opening;

wherein the actuator is movable while being out of contact with the at least one coupling element.

26. The invention of claim 14 wherein the actuator and the at least one coupling element are positionable entirely on opposite respective sides of a plane oriented transverse to the longitudinal axis.

27. The invention of claim 14 further comprising a pivot pin securing the at least one coupling element and the second joint portion, wherein the actuator is spaced apart from the pivot pin.

28. The invention of claim 14 further comprising a pivot pin securing the at least one coupling element and the second joint portion, wherein the actuator is distinct from the pivot pin.

29. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein said second part comprises an opening near the coupling element, and wherein a portion of the linking element passes out of the second part via the opening;

wherein the actuator is positioned in the universal joint to isolate the actuator from torque transmitted by the at least one coupling element.

30. The invention of claim 24 wherein the radially outer portion of the second joint portion comprises two spaced arms; and wherein the radially inner portion of the at least one coupling element extends between the two spaced arms.

31. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head wherein in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein said second part comprises an opening near the coupling element, and wherein a portion of the linking element passes out of the second part via the opening;

wherein an axis of the linking element passes through the opening free of intersection with the second joint portion of the second part.

32. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein said second part comprises an opening near the coupling element, and wherein a portion of the linking element passes out of the second part via the opening; wherein the second part comprises two spaced arms and wherein the opening is disposed in an external surface of the second part between the spaced arms.

33. The invention of claim 18 wherein the tool head engaging element bears on the ramp such that the elevated portion holds the tool head engaging element in the engaging position and the lowered portion allows the tool head engaging element to move to the releasing position.

34. The invention of claim 20 wherein the spring biases the linking element along an axis and wherein the spring and the linking element overlap to some extent along the axis.

35. The invention of claim 21 wherein the spring biases the linking element along an axis, wherein the linking element is guided in the second part in two regions axially spaced along the axis, and wherein the two regions are situated on opposite respective sides of the spring.

36. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein said second part comprises an opening near the coupling element, and wherein a portion of the linking element passes out of the second part via the opening;

wherein the actuator and the at least one coupling element are positionable entirely on opposite respective sides of a plane oriented transverse to a longitudinal axis extending through the drive stud of the second part.

37. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein said second part comprises an opening near the coupling element, and wherein a portion of the linking element passes out of the second part via the opening;

further comprising a pivot pin securing the at least one coupling element and the second joint portion, wherein the actuator is spaced apart from the pivot pin.

38. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable in the drive stud of the second part to alter effectiveness of the engaging element in retaining the tool head on the drive stud of the second part; and an actuator coupled to the linking element, said actuator manually movable by a user to move the linking element to affect retention of the tool head by the tool head engaging element;

wherein said second part comprises an opening near the coupling element, and wherein a portion of the linking element passes out of the second part via the opening;

further comprising a pivot pin securing the at least one coupling element and the second joint portion, wherein the actuator is distinct from the pivot pin.

39. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing-position, said engaging position comprising a range of positions including an outermost position;

a linking element coupled to the engaging element and movable in the drive stud of the second part to urge the engaging element outwardly to retain the tool head on the drive stud of the second part;

an actuator coupled to the linking element, said actuator manually movable by a user to move the linking element to affect retention of the tool head by the tool head engaging element; and a spring biasing the linking element to a rest position;

said linking element comprising a surface contacting the engaging element when the engaging element is in the outermost position, said surface oriented such that incremental movement of the linking element causes incremental movement of the engaging element when the linking element is in the rest position and the engaging element is in the outermost position;

wherein said second part defines an overall length, wherein said drive stud of the second part defines a minimum cross-sectional width transverse of the length, and wherein said length of the second part is no more than about five times the minimum cross-sectional width;

wherein the actuator is movable while being out of contact with the at least one coupling element; and wherein the actuator is manually movable by the user along a path, and wherein the path is oriented nonparallel with respect to a longitudinal axis extending through the drive stud of the second part.

40. The invention of claim 14 wherein said second part comprises an opening, and wherein a portion of the linking element passes out of the second part via the opening.

41. The invention of claim 14 or 39 wherein the actuator is positioned in the universal joint to isolate the actuator from torque transmitted by the at least one coupling element.

42. The invention of claim 14 or 39 wherein the second joint portion comprises a radially outer portion, and wherein the at least one coupling element comprises a radially inner portion that is at least in part received between parts of the radially outer portion.

43. The invention of claim 14 wherein said second part comprises an opening, and wherein a portion of the linking element passes out of the second part via the opening; and wherein the actuator and the at least one coupling element are positionable entirely on opposite respective sides of a plane oriented transverse to a longitudinal axis extending through the drive stud of the second part.

44. the invention of claim 14 wherein said second part comprises an opening, and wherein a portion of the linking element passes out of the second part via the opening; and further comprising a pivot pin securing the at least one coupling element and the second joint portion, wherein the actuator is spaced apart from the pivot pin.

45. The invention of claim 14 wherein said second part comprises an opening, and wherein a portion of the linking element passes out of the second part via the opening; and further comprising a pivot pin securing the at least one coupling element and the second joint portion, wherein the actuator is distinct from the pivot pin.

46. The invention of claim 14 wherein said second part comprises an opening, and wherein a portion of the linking element passes out of the second part via the opening; and wherein the actuator is positioned in the universal joint to isolate the actuator from torque transmitted by the at least one coupling element.

47. The invention of claim 14 wherein said second part comprises an opening, and wherein a portion of the linking element passes out of the second part via the opening; and wherein the second joint portion comprises a radially outer portion, and wherein the at least one coupling element comprises a radially inner portion that is at least in part received between parts of the radially outer portion.

48. The invention of claim 14 wherein said second part comprises an opening, and wherein a portion of the linking element passes out of the second part via the opening; and wherein an axis of the linking element passes through the opening free of intersection with the second joint portion of the second part.

49. The invention of claim 14 wherein said second part comprises an opening, and wherein a portion of the linking element passes out of the second part via the opening; and wherein the second part comprises two spaced arms and wherein the opening is disposed in an external surface of the second part between the spaced arms.

50. The invention of claim 40 wherein the opening is positioned near the coupling element.

51. The invention of claim 43 wherein the opening is positioned near the coupling element.

52. The invention of claim 44 wherein the opening is positioned near the coupling element.

53. The invention of claim 45 wherein the opening is positioned near the coupling element.

54. The invention of claim 46 wherein the opening is positioned near the coupling element.

55. The invention of claim 47 wherein the opening is positioned near the coupling element.

56. The invention of claim 48 wherein the opening is positioned near the coupling element.

57. The invention of claim 49 wherein the opening is positioned near the coupling element.

58. In a universal joint for use with a torque transmitting tool, said universal joint comprising a first part comprising

*a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:*

*a tool head engaging element movably mounted in the drive stud of the second part to engage the tool head when in an engaging position and to release the tool head when in a releasing-position, said engaging position comprising a range of positions including an outermost position;*

*a linking element coupled to the engaging element and movable in the drive stud of the second part to urge the engaging element outwardly to retain the tool head on the drive stud of the second part;*

*an actuator coupled to the linking element, said actuator manually movable by a user to move the linking element to affect retention of the tool head by the tool head engaging element;*

*said linking element comprising a surface contacting the engaging element when the engaging element is in the outermost position, said surface oriented such that incremental movement of the linking element causes incremental movement of the engaging element when the engaging element is in the outermost position;*

*wherein said second part defines an overall length, wherein said drive stud of the second part defines a minimum cross-sectional width transverse of the length, and wherein said length of the second part is no more than about five times the minimum cross-sectional width; and*

*wherein the actuator is movable while being out of contact with the at least one coupling element and the actuator is positionable closer to the coupling element than to the engaging element.*

\* \* \* \* \*